United States Patent [19]

Kühbauch et al.

[11] Patent Number: 4,995,135
[45] Date of Patent: Feb. 26, 1991

[54] OSCILLATING WIPER DEVICE FOR MOTOR VEHICLE WINDSHIELDS

[75] Inventors: Gerd Kühbauch, Bühlertal; Gotthilf Schaller, Leonberg, both of Fed. Rep. of Germany

[73] Assignee: Robert Bosch GmbH, Stuttgart, Fed. Rep. of Germany

[21] Appl. No.: 347,771

[22] PCT Filed: Nov. 5, 1987

[86] PCT No.: PCT/DE87/00497

§ 371 Date: Apr. 4, 1989

§ 102(e) Date: Apr. 4, 1989

[87] PCT Pub. No.: WO88/03486

PCT Pub. Date: May 19, 1988

[30] Foreign Application Priority Data

Nov. 8, 1986 [DE] Fed. Rep. of Germany ....... 3638159

[51] Int. Cl.⁵ .............................................. B60S 1/44
[52] U.S. Cl. .............................. 15/250.21; 15/250.23; 15/250.3; 74/99 A; 74/109
[58] Field of Search ........................ 15/250.13, 250.21, 250.23–250.25, 15/250.30–250.31, 250.33–250.36, 250.42; 74/23, 42, 44, 75, 96, 98, 99 R, 99 A, 89.18, 109

[56] References Cited

U.S. PATENT DOCUMENTS

| 2,852,799 | 9/1958 | Wallis | 74/96 |
| 2,878,506 | 3/1959 | Krohm | 15/250.21 |
| 3,019,469 | 2/1962 | Fox et al. | 15/250.21 |
| 4,776,056 | 10/1988 | Kuhbauch | 15/250.23 |

FOREIGN PATENT DOCUMENTS

| 0021914 | 1/1981 | European Pat. Off. | 15/250.21 |
| 2215307 | 10/1973 | Fed. Rep. of Germany | 15/250.21 |
| 2421093 | 11/1975 | Fed. Rep. of Germany | 15/250.21 |
| 3426607.0 | 1/1986 | Fed. Rep. of Germany | 15/250.21 |

Primary Examiner—Harvey C. Hornsby
Assistant Examiner—Charles E. Cooley
Attorney, Agent, or Firm—Michael J. Striker

[57] ABSTRACT

An oscillating wiper device for motor vehicle windshields comprising a wiper arm including an inner partial arm having guide means for supporting an outer partial arm for rotation about the longitudinal axis thereof and for longitudinal displacement relative to the inner partial arm, and a structure which enables rotation of the outer partial arm about the longitudinal axis thereof upon oscillating movement of a wiper blade.

12 Claims, 5 Drawing Sheets

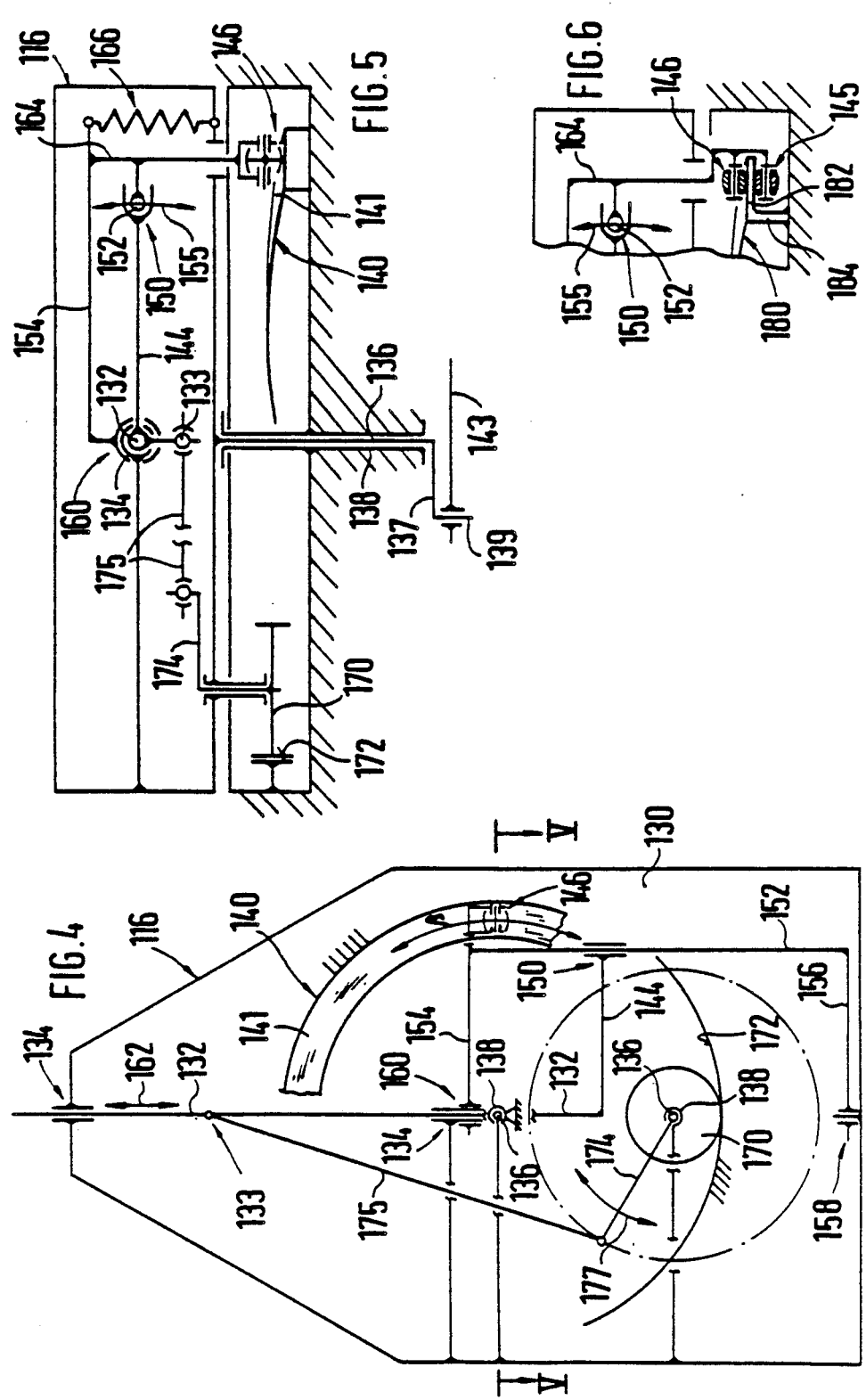

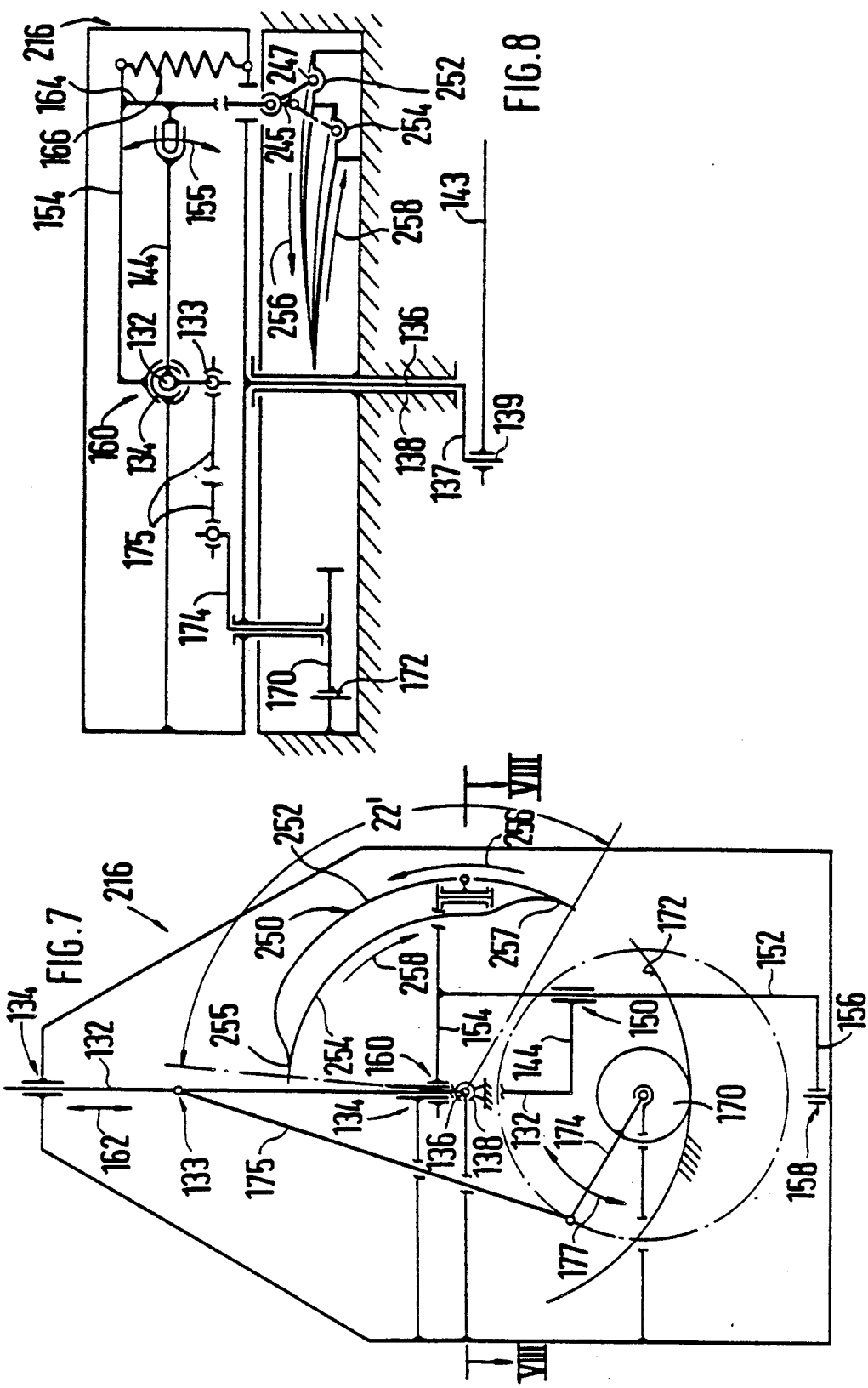

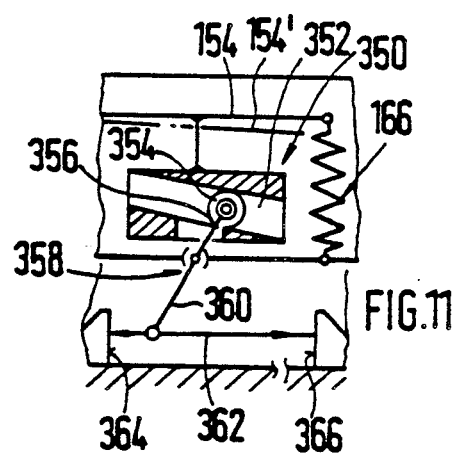
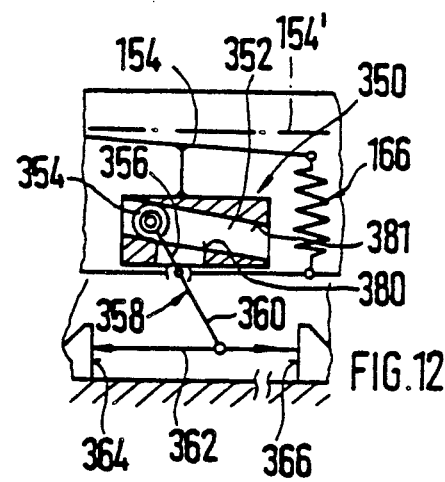
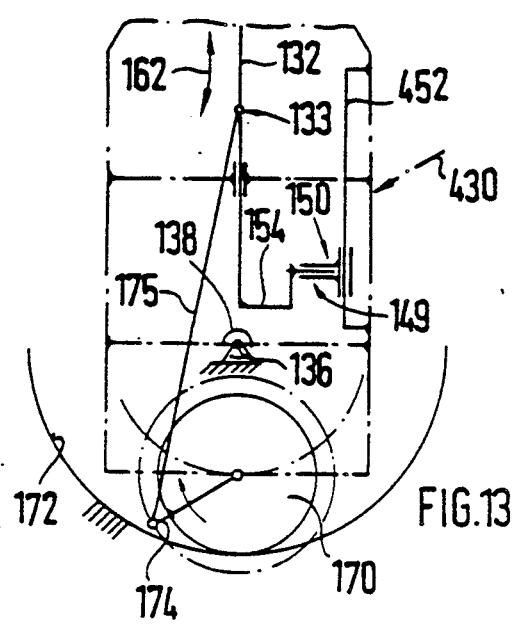
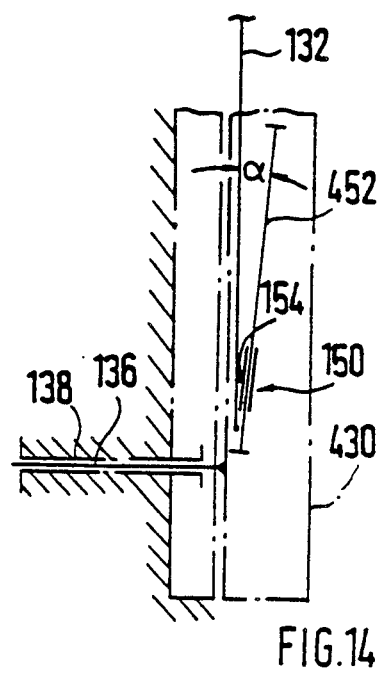

OSCILLATING WIPER DEVICE FOR MOTOR VEHICLE WINDSHIELDS

BACKGROUND OF THE INVENTION

The invention relates a wiper device for motor vehicle windshields An oscillating wiper device is known (US-PS 25 05 078) in which a central plane which passes through the wiper blade extends vertically on the windshield when the wiper blade placed on the windshield is not loaded. This wiper blade is capable of cleaning a planar windshield in an optimal manner, since the relations between the wiper blade and the windshield remain constant along the wiping field brushed over by it—on both the forward and return paths—that is, no deviations from the normal line occur. In spherically curved windshields, on the other hand, the slope of this central plane relative to the windshield surface changes constantly as seen along the entire wiping field. This change also varies as seen in the longitudinal direction of the wiper blade when the wipers are driven so as to oscillate, which wipers brush over a wiping field on the windshield, which wiping field is similar to a ring segment. The position of the plane relative to the windshield area penetrated by it is different at the outer curvature of the wiping field than on its inner curvature and is in turn different than at a center curvature which is described in operation by the link between the wiper blade and the wiper arm. In spherically curved windshields, the optimal alignment of the surface relative to the windshield described in the planar windshield can only be achieved in a punctiform manner and in such a way that it wanders constantly in the longitudinal direction of the wiper blade during the operation of the wiper blade. In so doing, the deviations from the ideal in the more sharply curved side areas of the windshield are greater than in the more planar windshield central areas. The flexibility of the wiper rubber can only partially compensate for these deviations.

Therefore, in the known oscillating wiper devices (DE-OS 34 26 607), the oscillating axis was previously adjusted relative to the windshield contour in such a way that the position of the central plane relative to the windshield area penetrated by it, which position comes closest to the ideal state, is achieved approximately in the center position of the wiper blade. The greater the curvature of the windshield as seen along the entire wiping field, the greater the error of deviation from the ideal position of the plane; this error is designated as the deviation from the normal line and is expressed in angular degrees. For the reasons explained above, the deviation from the normal line at the inner circle, the central circle and the outer circle constantly differs in magnitude. It also follows from the discussion above that the angle, at which a line situated in the described plane deviates from a vertical line on the windshield area penetrated by the line, is designated as the deviation from the normal line. Another difficulty also results in that the described relations in the forward path of the wiper blade deviate from those resulting during the return path of the wiper blade. The conditions which occur in so-called single-lever wiper systems are particularly difficult to master, since the wiper blade must treat both sharply curved side areas of the windshield.

SUMMARY OF THE INVENTION

The object of the invention is to provide an oscillating wiper device in which the wiper blade is constantly at an optimal position relative to the windshield area being wiped at any moment during the oscillating movement of the wiper blade due to rotation of the outer partial wiper arm around its longitudinal axis. The object of the invention is achieved by providing control means for effecting rotation of the outer partial wiper arm in response to an oscillating movement of the wiper blade.

The present invention as to its construction so to its mode of operation, together with additional objects and advantages thereof, will be best understood from the following description of the preferred embodiments with reference to the accompanying drawings.

BRIEF DESCRIPTION OF THE DRAWINGS

FIG. 4 shows a schematic partial view of another wiper arm according to the invention;

FIG. 5 shows a sectional view through the wiper arm according to FIG. 4 along line V—V;

FIG. 6 shows a partial sectional view of the wiper arm according to FIG. 5 and corresponding to another embodiment form of the invention;

FIG. 7 shows a schematic partial view of another wiper arm constructed according to the invention;

FIG. 8 shows a sectional view through the wiper arm according to FIG. 7 along line IIX—IIX;

FIG. 11 shows a partial sectional view through the wiper arm, according to FIG. 10, which is located in a first operating position;

FIG. 12 shows a partial sectional view similar to that of FIG. 11, wherein the wiper arm occupies a second operating position;

FIG. 13 shows a schematic partial view of a wiper arm according to another embodiment of the invention; and FIG. 14 shows a schematic side view of a wiper arm according to FIG. 13.

DESCRIPTION OF THE PREFERRED EMBODIMENTS

Figure 1:
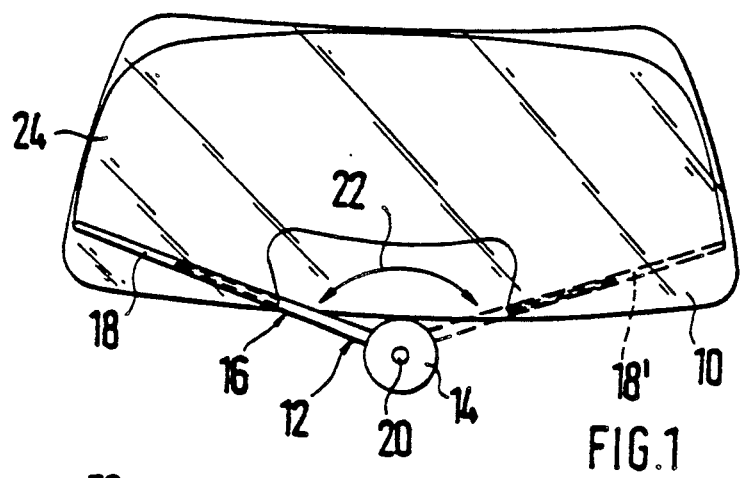
FIG. 1 shows a top view of the windshield of a motor vehicle with a wiper device assigned to it.

An oscillating wiper device 12 is assigned to a windshield 10 shown in FIG. 1. The wiper device comprises a step-down gearing 14 which drives a wiper lever 16 in a oscillating manner. The wiper lever 16 oscillates between two reversing positions, corresponding to the double arrow 22 shown in FIG. 1, around an oscillating axle 20 of the stepdown gearing 14 together with a wiper blade 18 which is fastened at its free end. One reversing position is shown in FIG. 1 by solid lines, while the other reversing position is shown in dashed lines and is designated by 18'. During the oscillating movement 22, a sliding movement which is affected radially relative to the oscillating axis 20, is imparted to the wiper blade lying on the windshield 10 to be wiped, so that the wiping field 24 brushed over by the wiper blade 18 has a shape which deviates from a circle segment. Wiping devices working in this manner have recently been used where a single windshield wiper must brush over the largest possible wiping field on the windshield to be wiped. In particular, windshield corner areas which are far from the oscillating axis 20 are also to be brushed over. However, regardless of this, it is conceivable also to employ wiping devices which operate in this manner if a plurality of wiping devices, particularly two wiping devices arranged one next to the other, are assigned to a motor vehicle windshield. The gearing of these two wiping devices is designed in such a way that each of the wiper blades belonging to it brushes over a wiping field which extends into the vicinity of the edge of the windshield and is to be considered as optimum. The wiper system discussed above is commonly designated a so-called oscillating lifting wiper system. However, the construction, according to the invention, is not limited to such oscillating lifting wiper systems; it can also be applied in the oscillating wiper systems which have been known for a long time, in which the wiping field is a ring segment whose center is the oscillating axis 20.

Figure 2:
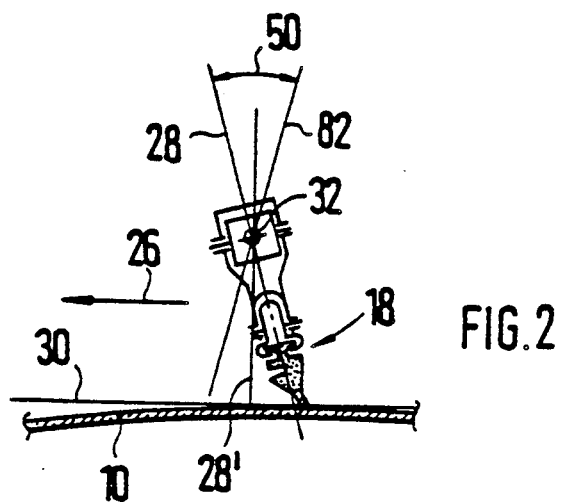
FIG. 2 shows a schematic view of a wiper blade of the oscillating wiper device, according to the invention, which wiper blade is arranged in the working position on the windshield.

FIG. 2 shows the wiper blade 18 in cross section, wherein it is displaced in the direction of arrow 26 along the windshield 10 to be wiped. In addition, FIG. 2 shows the plane 28 discussed in the introductory part of the description which is located in the longitudinal direction of the wiper blade. The position of the plane is designated by 28' as is known from the prior art. That is, it is vertically upright on a tangent line 30 which the curved windshield 10 contacts in its middle area and in that location where the vertical line 28' strikes the windshield 10. That is, the vertical line 28' forms a right angle with the tangent line 30.

Figure 3:
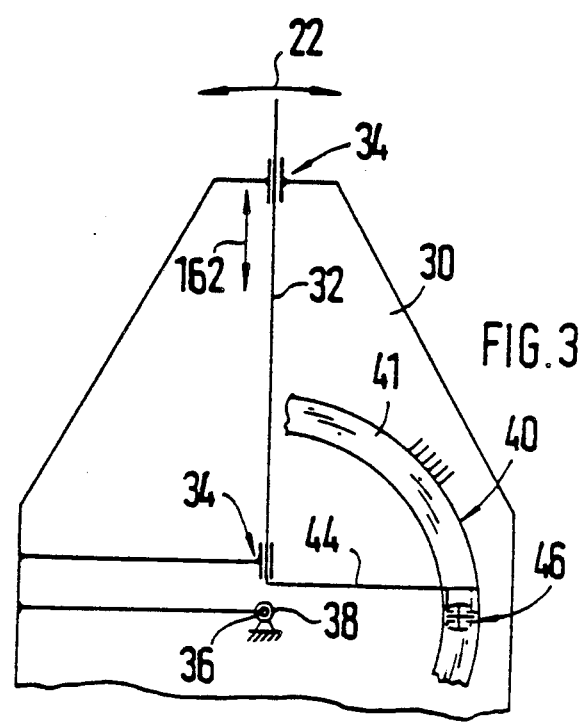
FIG. 3 shows a schematic partial view of a wiper arm belonging to the oscillating wiper device according to a first embodiment.
Figure 10:
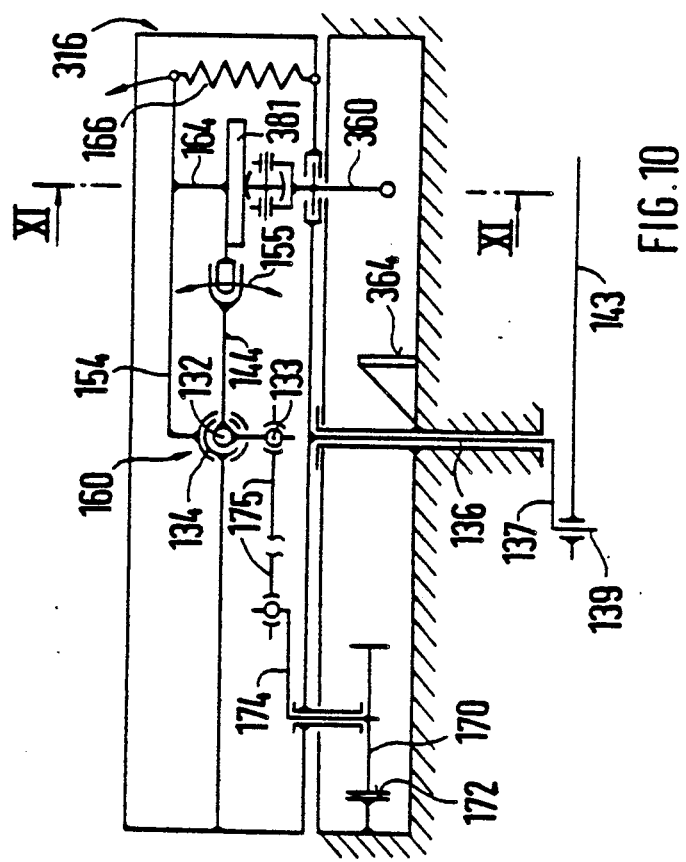
FIG. 10 shows a sectional view through the wiper arm according to FIG. 9 along, line X—X.
Figure 9:
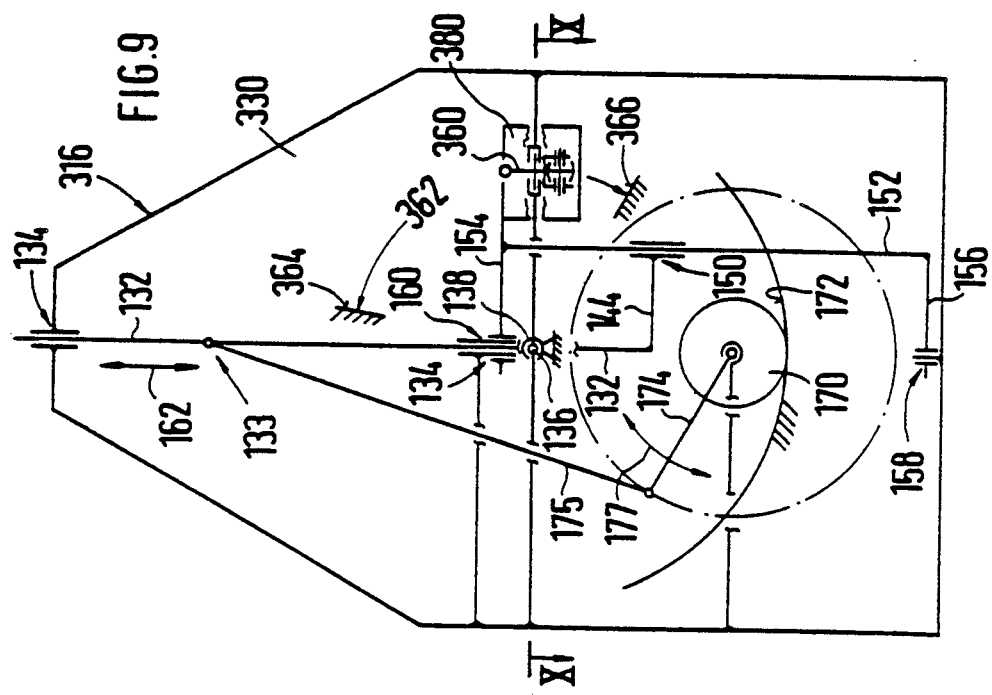
FIG. 9 shows another partial view of a wiper arm constructed according to another embodiment of the invention.

The basic principle of the invention is explained with reference to FIG. 3. A wiper arm 16 is shown in the latter in section and in enlarged scale. It comprises an inner partial arm 30 at which an outer partial arm 32 is supported in bearing bushes 34 of the inner partial arm 30 so as to be rotatable around its longitudinal axis. In addition, an oscillating shaft 36 is fastened at the inner partial arm 30 and is guided in a bearing bush 38 which is stationary with respect to the frame. The entire wiper arm 16 is accordingly capable of swiveling in the oscillating support 36, 38 in the direction of the double arrow 22. In the area of the inner partial arm 30, a track 40 which is stationary with respect to the frame and extends concentrically around the oscillating support 36, 38 of the wiper arm 16 is arranged at the vehicle body. If the wiper arm now oscillates in the direction of the double arrow 22 around the oscillating axis 20 of the oscillating support 36, 38, it can be said that the longitudinal axis of the outer partial arm 32 oscillates in a plane which is at a right angle relative to the oscillating axis 20. The track 40 is actually located in a plane which is situated below the drawing plane. It is accordingly actually covered by the inner partial arm 30. Its track surface 41 facing the partial arm 30 is inclined relative to the oscillating plane. A transverse or swiveling arm 44 is arranged at the outer partial arm 32 of the wiper arm 16 at its inner end, a roller 46 being fastened at the free end of the transverse or swiveling arm 44. The transverse arm 44 is spring-loaded in such a way that the roller 46 contacts the surface 41 of the track 40, which surface 41 faces it. During the oscillating movement (double arrow 22) of the wiper arm 16, the roller 46 remains in contact with the surface 41 of the track 40. Because of the inclination of the path relative to the oscillating plane, the transverse arm 44 is raised and lowered, respectively, corresponding to the path inclination. Accordingly, a swiveling movement (double arrow 50 in FIG. 2) of the outer partial arm 32 around its longitudinal axis occurs. The wiper blade 18, which is securely connected with the outer partial arm 32, is also moved in a swiveling motion with this swiveling movement of the outer partial arm 32.

The oscillating wiper device is thus provided with controlling means 40, 41, 44, 46 which force a rotational and swiveling movement (double arrow 50) of the outer partial arm 32 around its longitudinal axis, which rotational and swiveling movement is derived from the oscillating movement (double arrow 22). The controlling means are determined and designed in such a way that the wiper blade is located in an optimal position relative to the curvature of the windshield at every instantaneous operating position of the wiper device.

In the embodiment according to FIGS. 4 and 5, these controlling means are likewise formed by a track 140, a roller 146 likewise contacting the surface 141 of the track 140. The construction of the wiper arm 116 according to FIG. 4 accordingly corresponds to a great extent to the wiper arm 16 shown in FIG. 3. That is, it likewise comprises an inner partial arm 130 and an outer partial arm 132 which is supported in guides 134 of the inner partial arm 130. In addition, the inner partial arm 130 comprises an oscillating axle 136 which is securely connected with it and which is supported in an oscillating bearing bush 138 which is stationary with respect to the frame. In contrast to the embodiment according to FIG. 3, a swiveling or transverse arm 144 is connected with the outer partial arm 132, a sliding bush 150 being fastened at the free end of the swiveling or transverse arm 144. A column 152 is guided in the sliding bush 150, both of its ends being securely connected with swiveling arms 154, 156. The swiveling arms 154, 156 are supported at the inner partial arm 130 by their ends, which are remote of the column 152, in such a way that they can be swiveled around an axis which extends parallel to the longitudinal axis of the outer partial arm 132. The bearing of the swiveling arm 156 is designated by 158, while the other bearing for the swiveling arm 154 is designated by 160. As shown in FIG. 4, in addition, the outer partial arm 132 is displaceable in the guides 134 in the direction of the double arrow 162 and, moreover, is rotatable around its longitudinal axis exactly like the outer partial arm 32 in FIG. 3. The roller 146 is connected to the swiveling arm 154 via a support 164. In addition, a pretensioned tension spring 166 acts at the swiveling arm 154 (FIG. 5) and ensures that the roller 146 contacts the surface 141 of the track 140 as prescribed and in a force-locking manner. In addition, a pinion 170 is supported at the inner partial arm 130, which pinion 170 meshes with an inner toothing 172 which is stationary with respect to the frame. The inner toothing 172 encloses the oscillating support 136, 138 concentrically along a determined angle which is greater than the oscillating angle of the wiper blade 18. A crank 174 is fixedly connected with the pinion 170, a connecting rod 175 being articulated at the free end of the crank, its other end being connected with the outer partial arm 132 via a ball joint 133. In addition, FIG. 5 shows that the oscillating axle 136, which is securely connected with the inner partial arm 130, comprises a rocker arm 137 fastened at it, a crank pin 139 being fastened at the free end of the rocker arm 137. A connecting rod 143, which is part of a crank gearing which transforms a rotational movement into an oscillating movement, is supported at the crank pin 139. The oscillating wiping movement (double arrow 22) is accordingly imparted via the rocker arm 137 to the oscillating axle 136 and the inner partial arm 130 connected with the latter. A detailed description of the reciprocating movement (double arrow 162) of the outer partial arm 132 produced by the additional crank mechanism 170, 174, 175 is explained in more detail in our earlier U.S. Pat. No. 4,776,056, which is expressly referred to here and will be disclosed with the disclosure of the present patent application. When the wiper arm 116 swivels around the oscillating axis 20, the pinion 170 rolls at the inner toothing 172 and the crank 174 rotates in the direction of the double arrow 177, so that the connecting rod 175 transmits a lifting movement 162 to the outer partial arm 132. The outer partial arm 132 thus executes an oscillating movement (double arrow 22) together with the wiper blade 18, a lifting movement (double arrow 162) being superimposed on the oscillating movement. Also in this embodiment form, the outer partial arm 132 executes a swiveling or oscillating movement (double arrow 50, FIG. 2) around its longitudinal axis, since the swiveling arm 154 is lifted or lowered (double arrow 155) against the force of the contact pressure spring 154 so as to follow the course of the surface 141 of the track 140. Naturally, the column 152 and the swiveling arm 156 also move with the swiveling arm 154. This movement is naturally also transmitted via the bearing bush 150 to the transverse arm 144 and accordingly to the outer partial arm 132 and the wiper blade 18.

The embodiment according to FIG. 6 corresponds to the embodiment according to FIGS. 4 and 5, which was just discussed. However, in contrast to this, a second roller 145 is arranged at the support 164 at a distance from the rollers 146. The track 180 is formed in this embodiment by a band which is held via an angle support 184 so as to be stationary with respect to the frame. The roller 145 engages below the band 182, while the roller 146 rests on the other surface 141 located opposite the lower surface. The two rollers 145 and 146 are accordingly guided at the path 180 in a positive- or form-locking manner. A contact pressure spring can accordingly be omitted.

In the additional embodiment according to FIGS. 7, 8 and 9 to 12 and 13 and 14, the gearing construction for producing the lifting movement 162 is identical to that described with reference to FIGS. 4 and 5. For this reason, the structural component elements required for the lifting movement in all the aforementioned Figures are also designated with the same reference numbers as in FIGS. 4 and 5. This also applies to the articulated arrangement of the column guide 152, according to FIGS. 4 and 5, which is also realized in the embodiments according to FIGS. 7 and 8 and 9 to 12.

In order to achieve the swiveling or oscillating movement 50 of the outer arm part 132 in FIG. 7, a support 164 is fastened at the swiveling arm 154, a swivelable feeler 245 being articulated at the free end of the support 164 by its one end. The other end 247 of the feeler 245 is guided in a loop 250 which can be seen in particular in FIG. 7. The loop 250 forms a path which is inclined relative to the oscillating plane. It is arranged so as to be stationary with respect to the frame and is located opposite the inner partial arm 130 like the track 140 (FIG. 4). The loop 250 comprises two partial paths 252 and 254 which are guided together in their two end areas similarly to a railroad switch. The course of the two partial paths 252 and 254 varies with respect to the described oscillating plane, which is shown in particular in FIG. 8. In the area of the junctions 255, 257, which are similar to railroad switches, the partial path located in the front, as seen in the direction of the arrows 256, 258, lies somewhat higher than the other partial path so that, in the area of the switches 255, the feeler slips out of the partial path which is located somewhat higher into the partial path which is located lower and thus does not run back in a positively guided manner in the same partial path opposite to the direction of the arrows 256, 258 when the wiper arm 216 swivels back out of one oscillating direction into the opposite direction. In this way, the swiveling or rotational movement 50 of the outer arm part 132 can be adapted to the requirements in complete independence from the phase of the oscillating movement 22. The wiper blade can be adjusted in an optimal manner relative to every partial area of the windshield surface during the forward movement as well as during the return movement of the wiper blade. The loop 250, together with the feeler 245, 247, thus forms controlling means which force a rotational movement 50 of the outer partial arm 132 around its longitudinal axis via the swiveling arm 154, the column 152, the sliding bearing 150 and the transverse arm 144, the rotational movement 50 being derived from the oscillating movement (double arrow 22). The magnitude of the oscillating movement of the feeler 245, 247 is expressed in FIG. 7 by means of the reference number 22'.

In the embodiment according to FIGS. 9 to 12, the controlling means are formed by a connecting link 350 which comprises a channel 352 inclined relative to the oscillating plane. A control roller 354 is guided in the channel 352 and is arranged so as to be rotatable at one lever arm 356 of a two-armed lever 358. The other lever arm 360 of the two-armed lever 358 projects into an area 362 in which it cooperates with stops 364, 366 which are stationary with respect to the frame. The connecting link 350 is securely connected with the swiveling arm 154. When the wiper arm 316 oscillates in the direction of the double arrow 22, the stops 364 and 366, respectively, abut at the lever arm 360 of the two-armed lever 358 close to the so-called oscillating reversing positions, the lever arm 360 projecting into the area 362, so that this two-armed lever arm 358 is swiveled out of its one operating position (FIG. 11) into its other operating position (FIG. 12) and is brought out of the position according to FIG. 12 into the position shown in FIG. 11 during the counter-movement. During these movements of the two-armed lever 358, the connecting link 350, and along with the latter the swiveling arm 154, is moved out of its operating position into its other operating position via the channel 352, which is inclined relative to the oscillating plane, and via the roller 354 located in the channel, respectively. The two operating positions can be seen in FIGS. 11 and 12. The instantaneous operating position of the swiveling arm 154 is shown in solid lines, while the other operating position is shown in dash-dot lines and is designated by 154'. Also in this embodiment, a tension spring 166 is arranged at the swiveling arm 154 and is pretensioned and accordingly ensures that the respective operating position of the two-armed lever 358 and the swiveling arm 154 is maintained in a reliable manner. A swiveling movement 50 of the outer partial arm 132 around its longitudinal axis is achieved by means of the aforementioned arrangement of the column 152 and of the transverse arm 144 guided at the latter, which transverse arm 144 is in turn securely connected with the outer partial arm 132. This movement is naturally also transmitted to the wiper blade 18. Thus, for example, it is moved out of the one operating position shown in FIG. 2 into another operating position symbolized by a line 82 along an angle 50. The reversing of the wiper blade 18 from its one operating position into its other operating position is effected in the vicinity of the so-called oscillating reversing positions, where the stops 364 and 366, respectively, cooperate with the two-armed lever 358. It remains to mention that the connecting link 350 is only symbolized by means of indicating a channel wall 380 (FIG. 9) and 381 (FIG. 10) for the purpose of improved clarity of FIGS. 9 and 10.

In the embodiment according to FIGS. 13 and 14, the controlling means for the rotational movement of the outer partial arm 132 results from the longitudinal axis of the column 452 arranged at the inner partial arm 430 and the longitudinal axis of the outer partial arm 132 as seen in the direction of the oscillating plane (FIG. 14), forming an angle α. During the lifting movement 162 of the outer partial arm 132, the outer partial arm 132 is accordingly forced to rotate around its longitudinal axis and this rotational movement is transmitted to the wiper blade. The inclination of the axis of the guide column 452 relative to the longitudinal axis of the outer partial arm 132 is selected in accordance with requirements. The swiveling arm 154 is connected with the sliding bush 150 guided at the column 452 via a joint 149 in this construction.

It is clear that a wiper device constructed according to FIGS. 13 and 14 cannot be constructed as a so-called single-lever wiper system, since no effective agreement between the lifting movement and the oscillating or rotational movement of the outer partial arm 132 is possible because of the transmission ratio in the sliding crank gearing 170, 172, 174, 175.

While the invention has been illustrated and described as embodied in an oscillating wiper device for a vehicle windshield, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An oscillating wiper device for windshields of motor vehicles, said oscillating wiper device comprising an elongate wiper arm including an inner partial arm having oscillating support means and bush guide means, and a rod-like outer partial arm having a longitudinal axis and a control element; a wiper blade supported by said rod-like outer partial arm; means cooperating with said control element of said rod-like outer partial arm for enabling rotation of said rod-like outer partial arm about the longitudinal axis thereof upon oscillating movement of said wiper arm, said bush guide means of said inner partial arm supporting said rod-like outer partial arm for rotation about the longitudinal axis thereof and for relative longitudinal displacement thereof relative to said inner partial arm during operation of said oscillating wiper device; an elongate swivelling arm extending transverse to said inner partial arm and pivotably secured thereto, said means cooperating with said control element of said outer partial arm being arranged on said elongate swivelling arm and extending transverse thereto; a guide column extending parallel to the longitudinal axis of said rod-like outer partial arm and adjacent thereto, said elongate swivelling arm being connected to said guide column; and a guide bush connected with said rod-like outer arm and slidably and rotatably mounted on said guide column.

2. An oscillating wiper device according to claim 1, wherein said means cooperating with said control element of said rod-like outer partial arm is stationary relative to a frame of said oscillating wiper device and includes a track inclined relative to an oscillating plane of said wiper arm, said control element being guided in said track.

3. An oscillating wiper device according to claim 2, wherein said control element of said rod-like outer partial arm is formed as roller means.

4. An oscillating wiper device according to claim 3, wherein said track comprises two surfaces spaced from each other and turned away from each other, said roller means comprising two rollers contacting said two surfaces, respectively.

5. An oscillating wiper device according to claim 3, further comprising spring means for biasing said roller means into engagement with said track.

6. An oscillating wiper device according to claim 2, wherein said track comprises two track portions forming a loop, said two track portions having opposite ends that converge forming a junction.

7. An oscillating wiper device according to claim 6, wherein each of said two track portions is inclined to the oscillating plane at a different angle.

8. An oscillating wiper device according to claim 6, further comprising a swivelable feeler pivotably attached to said elongate swivelling arm and having a free end guided in said loop.

9. An oscillating wiper device according to claim 8, wherein said loop has a base, said oscillating wiper device further comprising a spring for biasing said free end of said feeler into engagement with said loop base.

10. An oscillating wiper device according to claim 1, wherein said means cooperating with said control element of said rod-like outer partial arm includes a lever connected with said inner partial arm in a vicinity of reversing positions of said lever and having first and second arms, two opposite stops stationary with respect to a frame of said oscillating wiper device and cooperating with said first arm, and a connecting link secured to said elongate swivelling arm and thereby to said rod-like outer partial arm and inclined relative to an oscillating plane, said second arm having an end portion guided in said connecting link.

11. An oscillating wiper device according to claim 10, wherein said lever has a center of rotation, said oscillating wiper device further comprising a spring for biasing said connecting link to the center of rotation of said lever.

12. An oscillating wiper device according to claim 1, wherein said means cooperating with said control element of said rod-like outer partial arms includes gear means.

* * * * *